(12) United States Patent
Cafarella et al.

(10) Patent No.: US 7,698,446 B2
(45) Date of Patent: *Apr. 13, 2010

(54) SYSTEM VERIFYING IF AN EMAIL REQUEST PASSED A POLICY CHECK BEFORE INITIATING AN INTERACTIVE TELEPHONY SESSION

(75) Inventors: Michael Cafarella, San Francisco, CA (US); Brandon Porter, Foster City, CA (US); Will H. Scullin, San Francisco, CA (US)

(73) Assignee: TellMe Networks, Mountain View, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 12/176,259

(22) Filed: Jul. 18, 2008

(65) Prior Publication Data

US 2008/0273676 A1    Nov. 6, 2008

Related U.S. Application Data

(63) Continuation of application No. 09/769,635, filed on Jan. 24, 2001, now Pat. No. 7,412,525.

(51) Int. Cl.
   *G06F 15/16* (2006.01)
(52) U.S. Cl. .................. 709/229; 709/227; 709/206
(58) Field of Classification Search ............ 709/229, 709/227, 206, 203, 228; 718/102, 105; 704/245; 370/236, 401, 352; 379/201.01, 154, 156, 379/157, 201.02
   See application file for complete search history.

(56) References Cited

U.S. PATENT DOCUMENTS

| | | | | |
|---|---|---|---|---|
| 5,381,546 A | * | 1/1995 | Servi et al. ............ | 718/102 |
| 5,526,413 A | * | 6/1996 | Cheston et al. ............ | 379/230 |
| 6,219,638 B1 | * | 4/2001 | Padmanabhan et al. ..... | 704/235 |
| 6,578,068 B1 | * | 6/2003 | Bowman-Amuah ........ | 709/203 |
| 6,643,262 B1 | * | 11/2003 | Larsson et al. ............ | 370/236 |
| 6,701,366 B1 | * | 3/2004 | Kallas et al. ............ | 709/227 |
| 6,766,007 B1 | * | 7/2004 | Dermler et al. ........ | 379/201.01 |
| 6,922,411 B1 | * | 7/2005 | Taylor ................... | 370/401 |
| 7,089,310 B1 | | 8/2006 | Ellerman et al. | |

(Continued)

OTHER PUBLICATIONS

Linda Boyer, IBM, Peter Danielsen, Lucent Technologies, Jim Ferrans, Motorola, Gerald Karam, AT&T, David Ladd, Motorola, Bruce Lucas, IBM, Kenneth Rehor, Lucent Technologies Voice eXtensible Markup Language (VoiceXML™) Version 1.0, May 5, 2000, p. 2.

*Primary Examiner*—Le Luu
(74) *Attorney, Agent, or Firm*—Perkins Coie LLP

(57) ABSTRACT

A system and method are provided for an intermediate party to facilitate an interactive telephony session between a customer and a sender of a request for the session. The sender can provide the request to the intermediate party via electronic mail. The request includes the information to initiate the interactive telephony session with the customer as well as the information to conduct that session. In one embodiment, the information to conduct the interactive telephony session includes a URL that provides an application in VoiceXML (Voice Extensible Markup Language). The intermediate party can initiate and conduct the session at the appropriate time and provide the sender with a status regarding the session. During the session, the customer can respond with voice or DTMF inputs to various prompts, thereby proceeding with a transaction and/or providing valuable feedback to the sender.

17 Claims, 4 Drawing Sheets

U.S. PATENT DOCUMENTS

| | | |
|---|---|---|
| 7,376,586 B1 | 5/2008 | Parlovi et al. |
| 7,412,525 B2 | 8/2008 | Cafarella et al. |
| 2001/0048676 A1 * | 12/2001 | Jimenez et al. ............. 370/352 |
| 2002/0093944 A1 * | 7/2002 | Shen et al. ................. 370/352 |

* cited by examiner

SYSTEM VERIFYING IF AN EMAIL REQUEST PASSED A POLICY CHECK BEFORE INITIATING AN INTERACTIVE TELEPHONY SESSION

CROSS REFERENCE TO RELATED APPLICATION

This application is a continuation of U.S. patent application Ser. No. 09/769,635, filed Jan. 24, 2001, titled "METHOD AND SYSTEM FOR PROVIDING INTERACTIVE TELEPHONY SESSIONS," which application is incorporated by reference herein in its entirety.

FIELD OF THE INVENTION

The present invention relates to telephony sessions, and in particular to interactive telephony sessions.

DISCUSSION OF THE RELATED ART

Automated telephony sessions are conducted in a variety of circumstances. For example, many hotels offer a service that automatically calls a guest at a predetermined time and, when the guest answers the room phone, plays an audio recording, such as "This is your wake-up call." Other businesses have similar services that can remind patients regarding appointments, notify customers regarding shipped orders, or provide members with information regarding upcoming dues.

However, the above-described sessions are one directional. In other words, the person answering the phone is merely the recipient of a recorded message. As a result, if the hotel guest wants to get another hour's sleep, but wants another wake-up call at the end of the hour, then the guest must initiate another call to the front desk to place this request. Thus, although an automated telephony session can provide a valuable service to the called party, this service lacks the attendant advantages of a person-to-person interaction.

Therefore, a need arises for an interactive telephony session that enhances service capability by facilitating more complex and, ultimately, beneficial interactions between the calling party and the called party.

SUMMARY OF THE INVENTION

The present invention includes a system and method for providing an interactive telephony session in which a called party can respond with voice or DTMF inputs to various prompts, thereby proceeding with a transaction and/or providing valuable feedback to the calling party. In a simplified system in accordance with the present invention, a message (the "Request") from the calling party (the "Sender") is received by a value-added intermediary (the "Receiver"). The Request includes the information to initiate the interactive telephony session with the called party (the "Customer") as well as the information to conduct that session. In one embodiment, the information to conduct the interactive telephony session includes a URL that provides an application in VoiceXML (Voice Extensible Markup Language).

In one embodiment, the Sender can send the Request to the Receiver using electronic mail (email). Then, using its application platform, the Receiver initiates the interactive telephony session using a telephone gateway. The application platform and the telephone gateway of the receiver can be implemented using various components in accordance with the present invention. In one embodiment, such a system can include an SMTP (Simple Mail Transfer Protocol) gateway interface that can receive the email from the Sender via the Internet. The SMTP gateway interface converts the email Request into a format that can be analyzed by an event queue interface.

In one embodiment, the event queue interface determines whether the Request passes one or more policy checks. One policy check could include confirming required resources, such as determining whether an associated file is attached to or referenced in the Request. Another policy check could include enforcing a Sender-specific limitation, such as rejecting any requests for calls placed/not placed during certain hours. Yet another policy check could include a Customer-specific limitation, such as limiting the volume (i.e. number) of calls that the Customer receives in a predetermined time period. Another policy check could include load management, such as modifying the selection of a plurality of telephony servers, determining a load-balancing scheme, maximizing the number of simultaneous calls as a percentage of capacity, and providing traffic-smoothing parameters. Yet another policy check could be security maintenance including data origin authentication, data integrity, as well as data confidentiality. In one typical embodiment, security maintenance is provided by using message digest authentication.

Assuming the Request passes the policy checks, the event queue interface then determines the availability of a telephony server to place an outgoing call. In accordance with one feature of the present invention, the telephony servers have ports that can be configured to receive incoming calls as well as to send outgoing calls. Thus, determining which telephony server will be available for an outgoing call can be a challenging task.

In the present invention, the assignment of a particular outgoing call to a particular telephony server is based on information gathered by an event queue server. Specifically, in one embodiment, an event queue server periodically queries and gathers various statistics of usage from one or more telephony servers. When an event queue server is faced with the decision of dispatching a request to one of the telephony servers, the event queue server picks a semi-randomized one, but biases toward the telephony server with the least load at that point in time. The choice is randomized so that several event queue servers can work in parallel, yet not overload a single telephony server. At the earliest availability, the event queue interface dispatches the Request to the appropriate telephony server, which in turn generates the outgoing call to the Customer and renders VoiceXML during the interactive telephony session.

Advantageously, the system of the present invention is scalable for low or high volume applications and can provide multiple levels of feedback to various Senders. For example, in accordance with one feature of the present invention, the status of a Request and its associated interactive telephony session can be logged into an accounting interface, thereby allowing the Sender to determine the success of its Request program as well as the efficiency of Receiver's system. In one embodiment, the accounting interface includes a standard log database and an HTTP server, thereby allowing Senders to view their respective accounts with the Receiver via the Internet. Reports regarding the Requests can include information to substantiate billing of the Sender by the Receiver, monitor the efficiency of system, and determine the "quality" of the interactions in the actual telephony sessions.

In accordance with one embodiment, the present invention can also provide multiple levels of service to various Senders. Specifically, Requests can be processed on a first-come first-served basis. In other words, no scheduling of the Request is provided for this first, basic (e.g. non-guaranteed) level of service.

In a second, enhanced level of service, the Request can be sent to an event scheduler. In one embodiment, the Sender would pay a higher fee for the enhanced level of service than that charged for the basic level of service. In return, the Receiver could schedule the Request to be sent at a Sender-designated time. This enhanced level of service could include additional efforts by the Receiver to successfully complete the Request for the Sender. These additional efforts could include increasing the number of retries for a rejected Request, or automatically rescheduling a "lost" Request within a predetermined interval. In another embodiment, the event scheduler could prioritize the Requests in the event queue interface such that Requests in the second, enhanced level of service are processed before Requests in the first, basic level of service. In fact, the present invention can establish any number and type of priorities using input from the Sender, the Customer, the Receiver, or a combination thereof.

In accordance with one feature of the present invention, the Receiver can use its own Customer database (including the Customer's preferences) to provide additional value-added services to the Sender. Specifically, in one embodiment of the present invention, the Receiver could automatically check both a Sender database (having Sender preferences) and the specific Customer database before sending the Request to the event queue interface. If a conflict is detected between these databases, the Receiver can determine which database should take priority. In general, for Customer satisfaction, the Receiver would typically ensure that any Customer preference is honored and therefore resolve the conflict by using the Customer database instead of the Sender database. Thus, Senders do not have to set up policies for every scenario. Instead, Senders can advantageously leverage behavior/preference information already gathered in the Customer database by the Receiver.

DETAILED DESCRIPTION OF THE DRAWINGS

In accordance with the present invention, an interactive telephony session allows a called party to respond with voice or DTMF inputs to various prompts, thereby facilitating complex transactions with and/or providing valuable feedback to the calling party. Many applications could benefit from using interactive telephony sessions. In one example, an auction house (on-line) can notify one of its customers that he/she has been outbid. The interactive telephony session could include asking if the customer wishes to increase his/her bid and then increasing/deleting the bid based on the customer's response.

In another example, a customer is notified that a stock has reached a certain price. The interactive telephony session could include asking if the customer wishes to sell/buy this stock and, if the response is affirmative, directly completing the transaction on-line or connecting the customer to his/her broker. In yet another example, a customer is notified that a certain product he/she has expressed an interest in has just arrived in the store. The interactive telephony session could include asking whether the customer wants to buy this product and then completing the transaction (buy/not buy) based on the customer's response. In one embodiment, the phone-based commerce approach described in U.S. patent application Ser. No. 09/466,236, incorporated herein by reference, entitled "Method And Apparatus For Electronic Commerce Using A Telephone Interface", filed 12 Dec. 1999 and having inventors Hadi Partovi et. al., can be used. As seen from the above illustrative examples, interactive sessions can significantly increase the efficiency of and customer satisfaction with telephony transactions.

General Overview

Figure 1A:
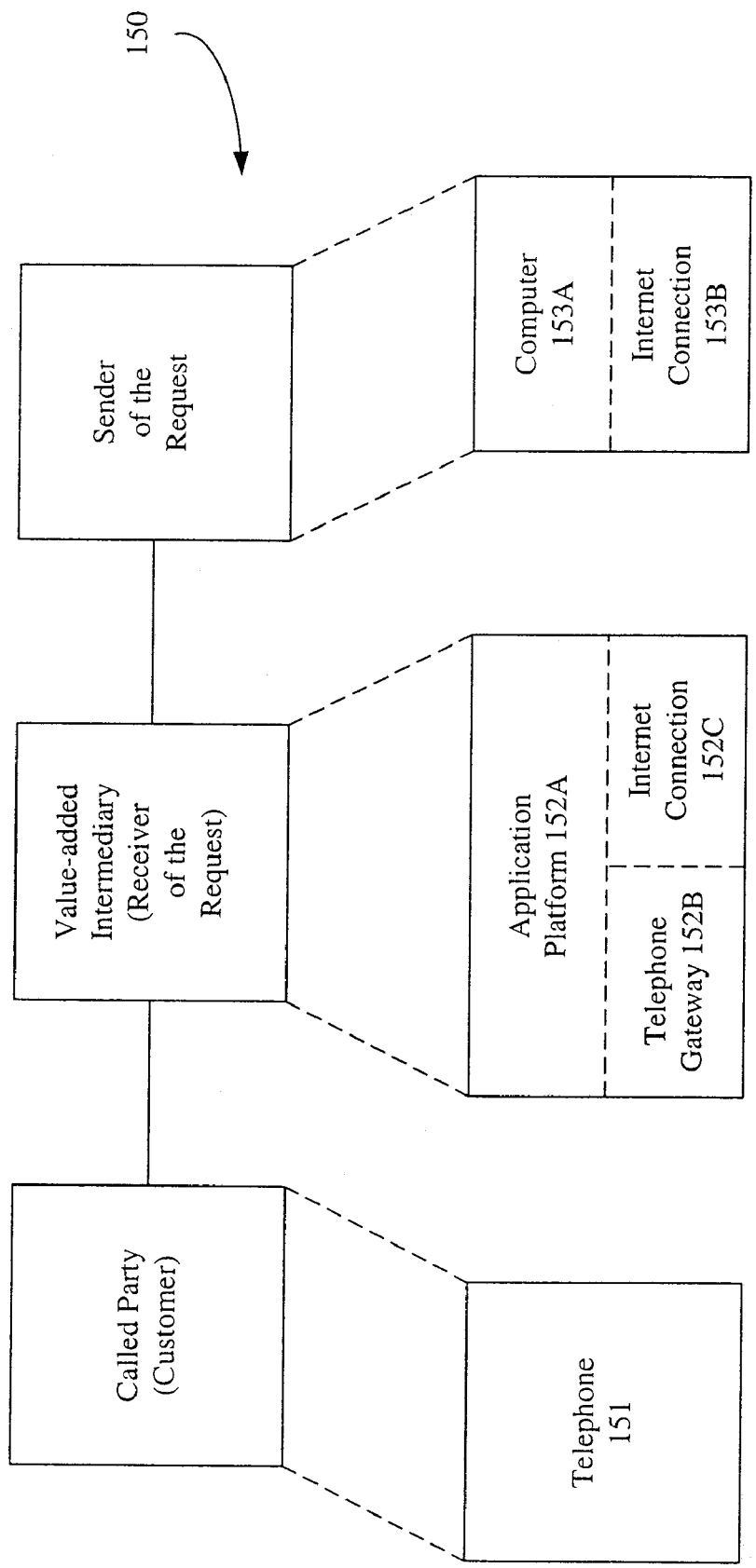
FIG. 1A illustrates a simplified block diagram of a system linking a calling party, a value-added intermediary for receiving a request from the calling party, and the called party.

FIG. 1A illustrates a simplified system 150 for providing a message from the calling party (the Sender) to the called party (the Customer). In accordance with the present invention, a value-added intermediary (the Receiver) facilitates the transfer of the message. The message can be provided via any programming language for designing and creating audio dialogs including, for example, synthesized speech, digitized audio, and recognition of spoken and/or dual-tone multi-frequency (DTMF) key input. In one embodiment, VoiceXML (Voice Extensible Markup Language) provides the above-listed features.

In one embodiment, the Sender provides its request for an interactive telephony session (the Request) to the Receiver using a computer 153A having an Internet connection 153B. The Receiver receives the Sender's Request via its Internet connection 152C. Then, using its application platform 152A, the Receiver initiates the interactive telephony session using a telephone gateway 152B. In a typical embodiment, the Customer can participate in the interactive telephony session using his/her telephone 151.

Figure 1B:
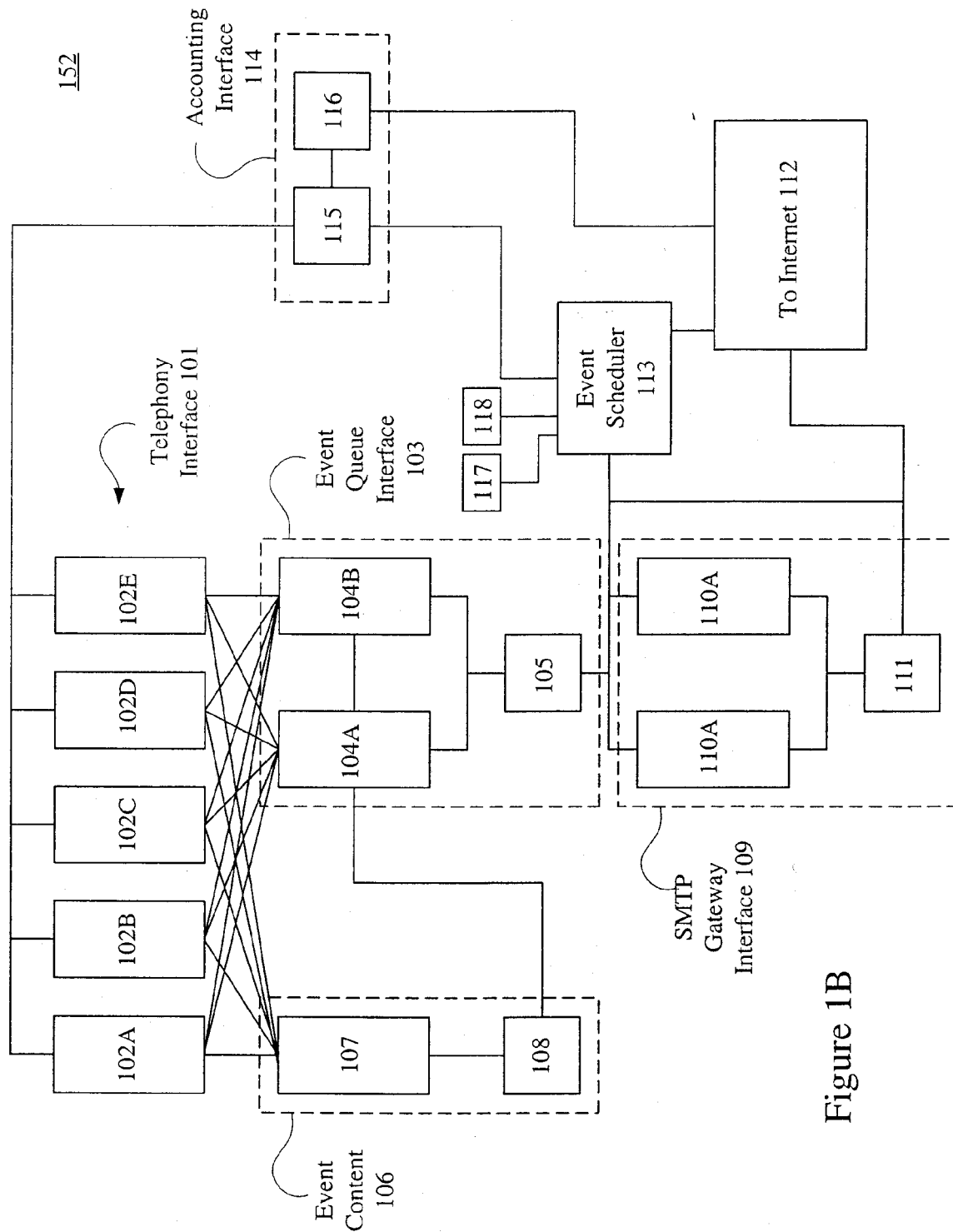
FIG. 1B illustrates a system for providing an automated, interactive telephony session in accordance with the present invention.

FIG. 1B illustrates a simplified block diagram of some of the components comprising application platform 152A, telephone gateway 152B, and Internet connection 152C (collectively, Receiver system 152). In one embodiment, Receiver system 152 includes an SMTP gateway interface 109 that can receive an email from the Sender via the Internet 112. Note that SMTP, which refers to the Simple Mail Transfer Protocol, is a standard server-to-server protocol used to transfer email. The email in this case includes the Request for the interactive telephony session. SMTP gateway interface 109 converts the email Request into a format that can be analyzed by an event queue interface 103.

An exemplary Request typically includes the Customer's telephone number and the URL associated with the VoiceXML to render. Other information included in the Request could include how long to let the phone ring before giving up or a time limit on the maximum session length (particularly relevant for long distance, i.e. expensive, calls).

Event queue interface 103 can then determine if the Request passes various policy checks, such as confirming required resources, enforcing a Sender- or Customer-specific limitation, managing system load, and maintaining proper security. Assuming the Request passes the policy checks, event queue interface 103 assesses the availability of a telephony interface 101 to place an outgoing call. At the earliest availability, event queue interface 103 dispatches the Request to telephony interface 101, which in turn generates the outgoing call to the Customer and renders VoiceXML during the interactive telephony session.

Note that in another embodiment of the invention, telephony interface 101 is replaced with an interface for transmitting voice samples through an Internet Protocol (IP) based network. This Voice over IP (VoIP) system can transform the voice data directly into IP packets, thereby eliminating the costly telephony components and their maintenance/upgrading. When transmitting voice through an IP network, a User Datagram Protocol (UDP) can be used at the transport layer. Although not as reliable as the Transmission Control Protocol (TCP), UDP is typically used for transporting VoIP for both delay and quality issues. Specifically, unlike TCP, UDP eliminates the "handshake" between the sending and receiving devices, thereby causing less delay. Note that introducing delay can affect voice quality. Moreover, unlike TCP, UDP does not retransmit data when it detects an error. Retransmitting voice packets, like handshaking, delays packet delivery and can also affect voice quality. In UDP, a package including an error is discarded and the last good packet is simply replayed. Typically, if the replayed packets are less than 5% of the total packets, then the receiving party listening to the message would not notice the replayed packets.

Advantageously, and described in further detail below, Receiver system 152 is scalable for low or high volume applications and can provide multiple levels of feedback and service to various Senders.

SMTP Gateway Interface

In accordance with one feature of the present invention, the Sender can send its Request in an email via Internet 112 to an email address specified by the Receiver (e.g. outbound@platform.receiver.com). In one embodiment, the email is formatted in a predetermined manner, thereby ensuring the proper transmission of the Request to the Receiver. SMTP gateway interface 109 receives the Request and, based on the analysis of a load balancer 111, forwards the Request to a particular mail server 110. Although the present invention is equally applicable to any number of mail servers 110, SMTP gateway interface 109, as illustrated in FIG. 1B, includes a plurality of mail servers 110A-110B, wherein each mail server 110 is an SMTP gateway.

In one embodiment, a mail server 110 can use the freeware Postfix to perform various email tasks in accordance with the present invention. In other embodiments of the invention, programs such as Sendmail or qmail can be used. For illustration purposes, Postfix is described in further detail herein.

Postfix is built from multiple programs, each program designed to perform a specific task, thereby giving the Receiver significant flexibility if the Receiver wishes to replace one or more Postfix programs. Moreover, Postfix can provide for large volume email receipt/delivery, typically on the order of a million messages per day.

In accordance with one feature of the present invention, multiple queues can be used to efficiently handle the incoming email requests. For example, a maildrop queue can be used for locally-posted emails (i.e. Receiver Requests); an incoming queue can be used to receive the locally-posted email as well as the externally-posted email from Internet 112; an active queue can be used for emails being acted upon (explained in detail below); and a deferred queue can be used for email requests that cannot be acted upon at that point in time, thereby providing means for notifying the submitter of rejected emails. In Postfix, a queue manager implemented in a mail server 110 can control the number of messages accepted from the incoming and deferred queues (i.e. one message from each queue is provided to the active queue).

Postfix can also optimize the transfer of emails to an event queue interface 103. Specifically, Postfix initially makes no more than two connections to event queue interface 103. Concurrency is then slowly increased until event queue interface 103 can no longer handle the load. If one or more event queue servers 104 crash, concurrency is decreased. Note that Postfix transfers the emails in the active queue in a round-robin fashion.

In the active queue, a mail server 110 identifies the email as a Request and then uses a script (for example, in Perl, Python, Java, Javascript, and/or some other programming language to examine the email. For example, the headers can be examined to verify security and identify the notification to send. Other information can be extracted from the email using the standard message fields. Then, mail server 110 can repackage the email for proper receipt by an event queue server 104.

In one embodiment, HTTP requests (POST or GET) can be used to present the email request to event queue interface 103. In some embodiments, the email can be omitted altogether and the request sent directly as an HTTP formatted request. In one embodiment, the HTTP formatted request includes many of the components of the email including: security and identity information. In one embodiment, the Secure Sockets Layer (SSL) protocol is used for transporting the HTTP request directly from Internet 112 to event queue interface 103. In one embodiment, predetermined security certificates are used to assist in verifying the identity of the requester and validating the request.

Event Queue Interface

In one embodiment, event queue interface 103 includes a load balancer 105 that receives the reformatted email Requests from SMTP gateway interface 109 and distributes that load to a plurality of event queue servers 104A-104B. Note that although only two event queue servers 104 are shown, other embodiments can include any number of event queue servers. To facilitate this distribution, each event queue server 104 can include an integrated server that listens for Requests. This integrated server typically operates in accordance with the Hypertext Transfer Protocol (HTTP), which defines how messages are formatted and transmitted in the Internet, as well as how servers connected to the Internet can respond to various commands.

Advantageously, once a Request is detected, an event queue server 104 can perform one or more policy checks on the request before dispatch. These policy checks could include confirmation of required resources, enforcement of Sender-specific limitations, Customer-specific limitations, and load management. For example, a confirmation of required resources could include determining whether an associated file, such as a sound file, is attached to the request. In another example, a Sender-specific limitation could include rejecting any requests for calls placed/not placed during certain hours. In another example, a Customer-specific limitation could include limiting the volume (i.e. number) of calls that a particular Customer receives in a predetermined time period. In yet another example, load management could include modifying the selection of the telephony servers (explained in detail below), determining the load-balancing scheme (low load, round robin, or a combination thereof), maximizing the number of simultaneous calls as a percentage of capacity, and providing traffic-smoothing parameters (adjusting the number of retries, the amount of time waited for a free line, etc.).

Another policy check could be security maintenance. Unauthorized access to or abusive conduct on telephony interface 101 can have potentially serious adverse effects on the Receiver and clients of the Receiver. For example, a third party could send misleading information, place large numbers of prank phone calls, conduct a voice-spam operation, request an unreasonable number of outgoing calls (thereby limiting other parties' access to system 152 and possibly even jeopardizing the Receiver's ability to receive incoming calls), send anonymous death/bomb/terror threats, or launch denial-of-service attacks against the phone systems of other parties (including public health and safety numbers, such as 911).

To minimize the potential occurrence of any of the above-described undesirable scenarios, the present invention can include various security mechanisms. As known by those skilled in the art, the term "security" can encompass considerations of data origin authentication, data integrity, as well as data confidentiality. Data origin authentication refers to confirming the origin of the received data. Data integrity refers to ensuring that data and data sequences have not been altered in an unauthorized manner. Finally, data confidentiality refers to ensuring that the data is not disclosed or provided to unauthorized parties. Each of these factors should be weighed when determining the appropriate security mechanism for the Receiver's system.

In accordance with the present invention, a first security mechanism could include source IP checking, wherein each outgoing call request is confirmed as being sent by an authorized Sender (for example, one of the Receiver's clients) by checking the address of the Sender. However, this security mechanism could allow eavesdropping parties to read the authorized Senders' requests or perhaps even inject their own requests into the system. To address these concerns, in one embodiment, the Sender could, in addition to its username, also provide a password to authenticate the Request. Clearly, this additional security procedure can be undermined if the same party is eavesdropping on the network when the unencrypted password is transmitted to the Receiver.

In a second security mechanism, message digest authentication is performed. In this mechanism, after the Receiver receives an outgoing call request, the Receiver issues a "nonce" (a value which functions as a challenge) to the Sender. In reply, the Sender provides its username and a message digest, i.e. a checksum calculated from its username, password, and nonce. The Receiver can look up the Sender's password (securely stored previously in a one-time event) corresponding to the submitted username. Then the Receiver repeats the same calculation performed by the Sender using the Sender's correct password. If the two numbers are the same, the origin of the data as coming from an authorized Sender is confirmed.

Standard message digest authentication can provide reliable data origin authentication, but does not provide data integrity. Therefore, to provide this feature, additional values can be included in the checksum. For example, in one embodiment, a Request could include a timestamp for when the Request was generated, the Request content (i.e. the URL and/or the VoiceXML), the username, and the message digest, wherein the message digest is now a checksum calculated using the timestamp, the Request content, the username, and the Sender's password. In a typical embodiment, the checksum is a hash (i.e. one-way) algorithm that produces a string unique to the message.

For example, one type of hash algorithm developed by RSA Data Security Incorporated, MD5, takes a variable length input and returns a fixed length output. Specifically, the MD5 algorithm creates a digest of 128 statistically independent bits that have no calculable relation to the original input. Another type of hash algorithm developed by NIST (National Institute of Standards and Technology) and NSA, SHA1, creates a digest of 160 statistically independent bits.

Once again, after receiving the checksum, the Receiver can look up the Sender's password (securely stored previously in a one-time event) corresponding to the submitted username. Then the Receiver repeats the same calculation performed by the Sender using the Sender's correct password. If the two numbers are the same, the origin of the data as well as the integrity of the data coming from an authorized Sender are confirmed.

Advantageously, to protect against the threat of request reordering (by either the Sender or an unauthorized party who has captured the Request), the Receiver can evaluate the timestamp to determine (1) if the Request is recent and (2) its relation to other Requests sent by the same Sender. In one embodiment, only Requests having a timestamp within a predetermined time period are evaluated for reordering. Specifically, if the timestamp is "stale", i.e. before the predetermined time period, then the Request can be rejected immediately. On the other hand, if the timestamp is "recent", i.e. within the predetermined time period, then the checksum of the Request can be compared to a list of checksums of recently received Requests, thereby limiting the size of the list of Requests to the total of checksums received during that time period.

To protect against reordering in a configuration having multiple event queue servers 104, a checksum received by, for example, event queue server 104A could be compared to checksums received by other event queue server 104B. In one embodiment, this function can be provided by event queue server 104A forwarding its recently received checksums to event queue server 104B (and vice versa). Event queue server 104B can retain this checksum in a listing of "invalid" checksums for the above-described predetermined period of time. In this manner, if event queue server 104B receives a request previously dispatched by event queue server 104A, then event queue server 104B can reject that request. If a new event queue server 104C (not shown) is added to event queue interface 103 (or an event queue server 104 malfunctions and loses its list), then its "invalid" checksum list can be updated (or initialized) to the "invalid" checksum list of either event queue server 104A or event queue server 104B (in this case, load balancer 105 recognizes the socket within a predetermined period of time and then proceeds to dispatch Requests to the new event queue server in a standard fashion). Each event queue server 104 is responsible for eliminating any timed out entries (as set by the predetermined time period) on its list of recently received checksums as well as its list of invalid checksums.

Note that event queue interface 103 is more effective in applications having relatively few event queue servers 104. In applications having a large number of event queue servers 104, event queue interface 103 could have a centralized database (or a small set servers) dedicated to evaluating checksums. Thus, the overhead of this new configuration would include accessing the centralized database (or dedicated servers).

In yet another security mechanism, full message encryption can be used. Although this mechanism can ensure origin authentication, data authentication, and data confidentiality, the load on the CPU (not shown) compared to the previous mechanisms may be significantly increased, thereby degrading system performance during volume request processing. Therefore, a Receiver's system, in addition to the Senders' needs for confidentiality, should be considered when determining the appropriate security mechanism.

Note that none of the above security mechanisms protect against the threat of unauthorized deletion or suppression of Requests from Senders. However, this threat is effectively outside the realm of control of the Receiver and, therefore, is more appropriately dealt with by the Sender.

Telephony Interface

In accordance with one feature of the present invention, telephony interface 101 includes a plurality of telephony servers 102A-102E. Note that other embodiments of the invention can include any number of telephony servers 102. These telephony servers 102, unlike telephony servers in a typical telephone system, have ports that are not dedicated to either incoming or outgoing calls. Instead, the ports of these servers 102 can be configured to receive incoming calls as well as to send the outgoing calls of the present invention. Of importance, the current cost per port can be quite expensive, i.e. over $1000 per port. Therefore, the present invention implemented with non-dedicated ports can provide significant cost savings to the Receiver.

To provide this dual functionality, telephony servers 102 are reconfigured. Specifically, each port on a telephony server 102 can be configured for receiving and transmitting (IN/OUT) Requests. In one embodiment, the reconfiguration of telephony servers 102 includes requesting the telephone carrier, e.g. AT&T, Qwest, Sprint, MCI Worldcom, British Telecom, etc., to reconfigure the trunk groups, i.e. the collections of PRIs for two-way calling.

However, this dual functionality and resulting flexibility to the Receiver can create certain logistical challenges. Specifically, many companies use a dedicated phone connection for supporting high data rates. For example, a DS3 line (also referenced in the computer industry as a T-3 line) supports a data rate of approximately 45 megabits per second. Specifically, each DS3 line includes 672 individual channels, wherein a channel can be used as a communication path between two devices. In a DS3 line, each channel supports 64 kilobits per second.

A company typically establishes multiple Primary Rate Interfaces (PRIs) through its DS3 line. A PRI in the U.S., which conforms to an international communications standard for sending voice and data over telephone lines (i.e. the integrated services digital network (ISDN)), includes 23 Bearer (B-) channels for transmitting data/voice and one D-channel for transmitting control data. Note that the number of available B-channels for voice is carrier dependent. In one embodiment, all B-channels can be used for voice and the D-channel can be used for ISDN call set-up data. Essentially, the PRI connects the PBX (private branch exchange) of the company to the central office of the telephone company. In the context of the present invention, any number of PRIs can be provided, wherein a telephony server 102 can service multiple channels from one or more PRIs.

The distribution of incoming calls over the DS3, and in particular the PRI, is controlled by complex algorithms proprietary to the telephone carrier and/or the equipment manufacturer, e.g. Lucent and Nortel. Moreover, malfunction of either a telephony server 102 or equipment used by the telephone carrier (not shown), thereby affecting which telephony server receives a call (incoming or outgoing), can add considerable uncertainty to the process. Thus, assuming multiple telephony servers are provided, determining which telephony server 102 will be available for an outgoing call (i.e. a Request) can be a formidable task.

In accordance with one feature of the present invention, the assignment of a particular outgoing call to a particular telephony server 102 is based on information gathered by event queue interface 103. Specifically, in one embodiment, each event queue server 104 periodically queries and gathers various statistics of usage from telephony servers 102. This information could include, but is not limited to, determining how many channels is each telephony server currently serving, when did each telephony server receive its last incoming telephone call, when did each telephony server start up, and when did each telephony server transition from full capacity to non-full capacity (i.e. having the capacity to handle at least one phone call). Clearly, if one telephony server 102 is offline or otherwise malfunctioning, then event queue servers 104 can identify this state and avoid dispatching any Requests to that telephony server.

The present invention can use this valuable information to minimize a phenomena called "glare", in which a non-defined state on the telephone line occurs. For example, glare could occur if a single telephony server 102 received both an incoming phone call from the telephone company and an outgoing call Request from event queue interface 103 within a predetermined period of time.

In one embodiment, each event queue server 104 maintains a current load status for all telephony servers 102. When an event queue server 104 is faced with the decision of dispatching a Request to one of telephony servers 102, event queue server 104 picks a semi-randomized one, but biases the telephony server 102 with the least load at that point in time. Note that the choice is randomized so that several event queue servers 104 can work in parallel and not overload a single telephony server 102.

Reporting

In accordance with one feature of the present invention, the status of a Request and its associated interactive telephony session can be logged into an accounting interface 114, thereby allowing the Sender to determine the success of its Request program as well as the efficiency of Receiver system 152. In one embodiment, accounting interface 114 includes an Oracle log (accounting) database 115 and an HTTP server 116, thereby allowing Senders to view their respective accounts with the Receiver via Internet 112. HTTP server 116 can generate reports that are human- or machine-readable. In general, HTTP server 116 generates queries on database 115 and acts independently from other components of Receiver system 152.

In the present invention, reports on the Requests and associated interactive telephony sessions can vary dramatically depending on the needs and creativity of the Senders and the Receiver. Typical categories of reports include call accounting, service performance, and application correctness. A call accounting report could include how many outbound connections have been placed and how long those connections lasted, thereby providing a record to substantiate billing of the Sender by the Receiver. A service performance report, typically used internally by the Receiver, could include data to monitor the efficiency of Receiver system 152. For example, this data could include determining the success rate of event queue interface 103 dispatching Requests to telephony interface 101, the fail rate of various components of Receiver system 152, and placed-call failures and associated data for those failures. An application correctness report could include data regarding the number of Customers actively participating in the interactive telephony session and the time each of those Customers spent participating during the session. Other reports could indicate overall utilization of port capacity and/or the number of failed/answering machine/completed calls.

Figure 2A:
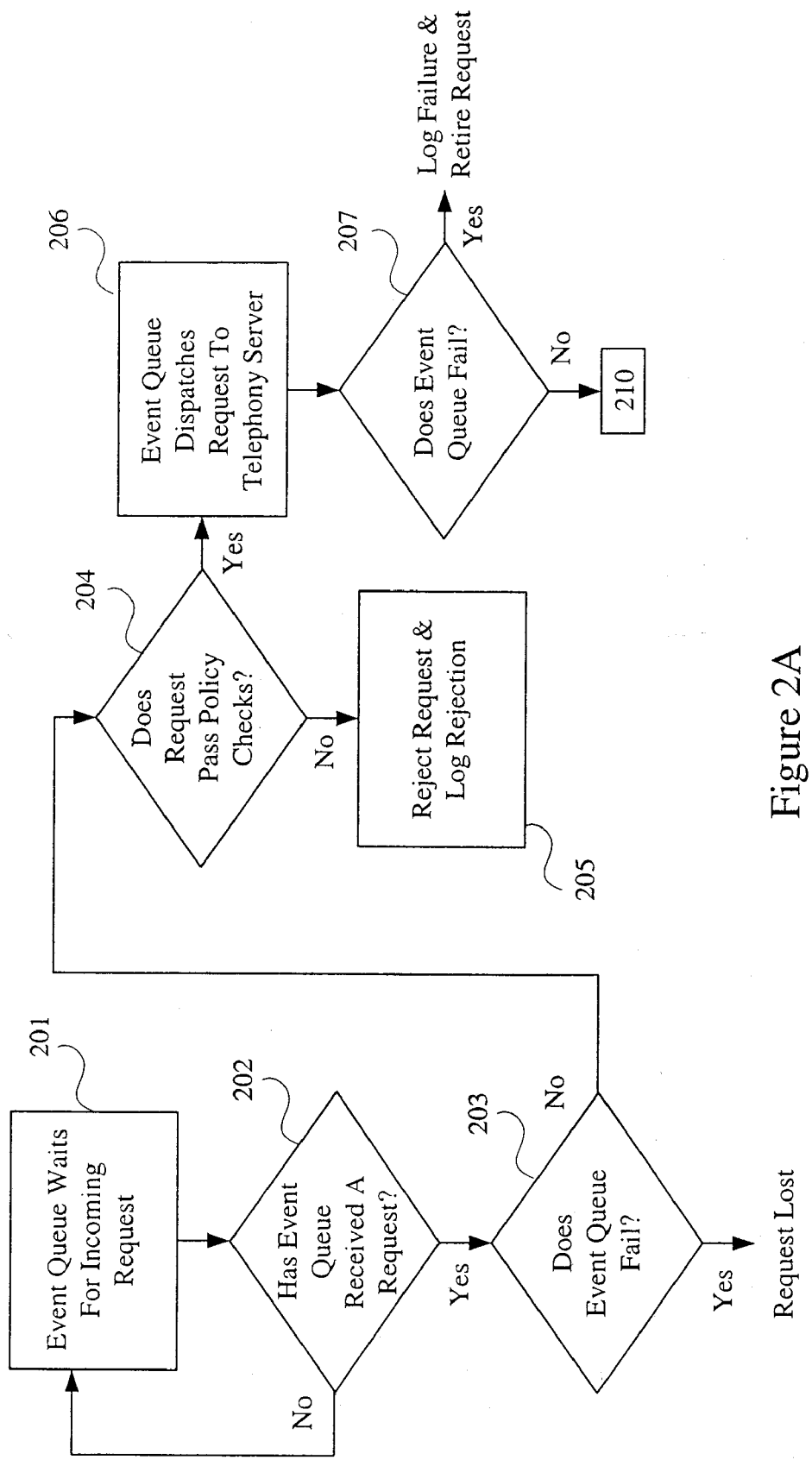
FIGS. 2A and 2B illustrate one embodiment of reporting for an automated, interactive telephony session in accordance with the present invention.
Figure 2B:
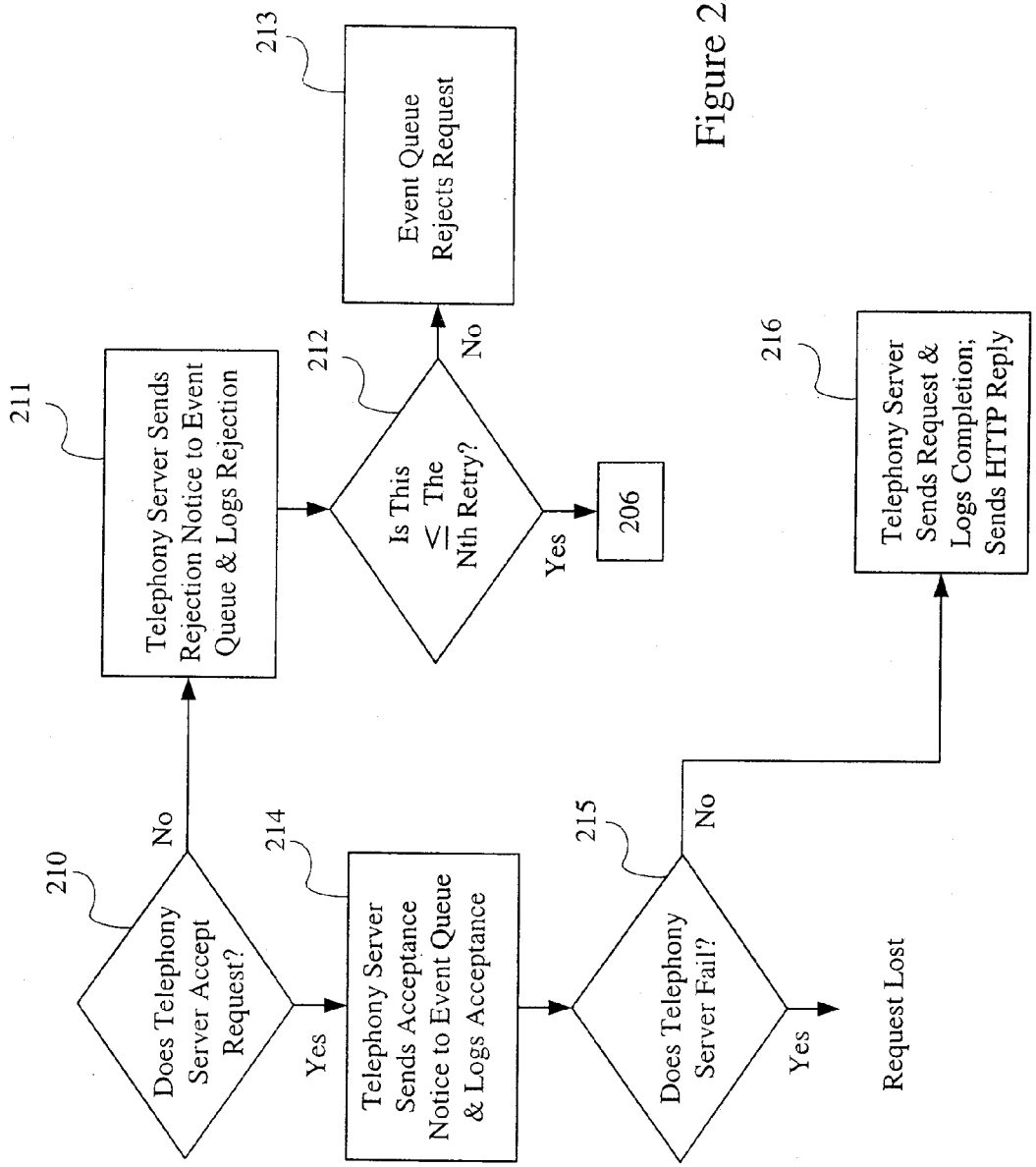

FIGS. 2A and 2B illustrate a flow chart of the Request process in accordance with one embodiment of the present invention. In step 201, an event queue server waits for notification of incoming Requests from the SMTP gateway interface. After a Request is received, as determined in step 202, the event queue server could fail. If the event queue server fails, as determined in step 203, the Request is lost. However, if the event queue server does not fail, then it can proceed to determine if the Request passes policy checks in step 204. These policy checks could be provided by the Sender, the Receiver, the Customer, or a combination thereof (described above and in further detail below in reference to event scheduler 113). If the Request fails to pass policy checks, then the event queue server rejects the Request and logs the rejection in the accounting database in step 205 (either directly (not shown in FIG. 1B) or via telephony server 101). In another embodiment, the event queue servers could have their own respective logs that are then aggregated for reporting.

If the Request passes policy checks, then the event queue server dispatches the Request to a telephony server in step 206. If the event queue server fails at this point, as determined in step 207, then the failure is logged and the Request retired from active processing. Note that more information can be ascertained by other processes through an examination of the logs. Some embodiment of the invention may maintain a list of such "soft" failing numbers and reject further requests for calls to such numbers for a predetermined period of time and/or after a predetermined number of failures.

However, if the event queue server does not fail in step 207, then the present invention proceeds to step 210 in which the telephony server can either accept or reject the Request. If the Request is rejected (for example, the telephony server may be serving an incoming call), then the telephony server sends a rejection notice to the event queue server and logs the rejection in the accounting database in step 211. At this point, in one embodiment, the dispatching event queue server can determine if a retry should be attempted. In one embodiment, a system administrator can configure the event queue server to allow for N retries, as provided in step 212. If N retries have already been attempted, then the event queue server rejects the Request. If a retry is allowed, the event queue returns to step 206 and dispatches the Request to a telephony server (note that it could be the same or a different telephony server depending on the method used for dispatching).

If the telephony server accepts the Request in step 210, then the telephony server sends an acceptance notice to the dispatching event queue server and logs the acceptance notice in the accounting database. At this point, the dispatching event queue server can remove the dispatched Request and return to step 201. Note that if the telephony server fails after logging its acceptance of the Request, then the Request is probably lost, as indicated in step 215. However, if the telephony server does not fail, then it can place the call, access the URL to run the appropriate application (including VoiceXML) (using an internal interpreter and a Web port), render the VoiceXML when the Customer answers the phone, and generate a log event in the accounting database in step 216.

Note that in one embodiment, the telephony server can also send an HTTP reply to the Sender in step 216 via the Internet. In this embodiment, the Sender can be certain of the status of the Request (i.e. successful completion of the interactive telephony session). In other embodiments, the Sender may also request immediate feedback regarding rejected or lost Requests, thereby allowing the Sender to reorder the Request at a future time. In these embodiments, the HTTP reply can be sent during the appropriate step (i.e. during step 203, 205, 207, 213, or 215). These embodiments also provide a definite status for the Sender's Requests. In yet other embodiments, no HTTP reply is sent and the Sender can check on the number of calls made within a certain time frame (optionally including the status of individual Requests) in accounting interface 114. Thus, these embodiments allow the Sender to check on the status of those Requests at the Sender's initiative.

For some applications, a Sender may want to associate a given entry in a report with a piece of data in its own database. For example, if the Sender is an auction house, the piece of data could be an ID number associated with a certain auction or the Customer's email address. Therefore, in one embodiment of the invention, each Request could have a predetermined field for an arbitrary piece of user data. The components of Receiver system 152 would ensure that this user data is ultimately transferred to accounting database 115 with the status information on the Request.

Levels of Service

In accordance with one embodiment, the present invention can provide multiple levels of service. As described above, when Receiver system 152 receives a Request from a Sender via Internet 112, the Request is processed on a first-come first-served basis. Thus, no scheduling of the Request is provided for this first, basic (e.g. non-guaranteed) level of service.

In a second, enhanced level of service, the Request can be sent to an event scheduler 113 via Internet 112. In one embodiment, the Sender would pay a higher fee for the enhanced level of service than that charged for the basic level of service. In return, the Receiver could schedule the Request to be sent at a Sender-designated time (typically, a predetermined time specified in the Request or computed from the timing of the Request). As a result, the associated Request would include the Sender's instructions regarding the desired transmission of the Request in addition to the other fields. Event scheduler 113 could store this Request in accounting database 115, thereby allowing the Sender to also check on the status of its future interactive telephony sessions.

This enhanced level of service could include additional efforts by the Receiver to successfully complete the Request for the Sender. For example, in step 212, an enhanced level of service could provide a high N value (i.e. the number of allowable retries). Or, if Receiver system 152 detects that a Request is lost (see steps 203, 207, or 215), then event scheduler 113 could automatically reschedule that Request within a predetermined interval. In another example, event scheduler could prioritize the Requests in event queue interface 103 such that Requests in the second, enhanced level of service are processed before Requests in the first, basic level of service. In yet another example, event scheduler 113 could prioritize the Requests based on domain name, i.e. internal Requests could be placed first followed by external Requests from Senders, with higher paying Senders coming before other Senders. In yet another example, the Senders could be asked to characterize their own Requests. For example, one characterization could distinguish between mass (i.e. bulk) Requests and solitary Requests. In this manner, the Receiver could prioritize the Requests based on system load, wherein solitary Requests (providing minimal load to the system) would be processed before mass Requests (providing significantly more load to the system). Or, the Senders could be asked to rank the priority of their own Requests on a predetermined scale. Thus, as seen from the above examples, the present invention can establish any number and type of priorities using input from the Sender, the Customer, the Receiver, or a combination thereof.

Note that the present invention advantageously allows multiple levels of service to operate in parallel. Thus, a Sender can decide to send certain lower priority Requests using the basic service and send other higher priority Request using the enhanced service. Advantageously, event scheduler 113 can send requests to either SMTP gateway interface 109, if repackaging of the Request is necessary, or directly to event queue interface 103 if formatting of the Request is acceptable.

Event scheduler 113 can also communicate with a Sender database 117 and/or a Customer database 118. Note that the Receiver can maintain a database for its own customers. In some circumstances, the Receiver's customers can also be the Sender's Customers. Thus, information regarding the behavior/preferences of a particular Customer may already exist in a known database, i.e. Customer database 118. In another embodiment of the invention, Customer database 118 could be maintained by a third party, wherein the third party allows the Receiver some access to that database. Using Customer database 118, the Receiver can provide additional value-added services to the Sender. For example, a Sender could indicate that a certain Request should be sent between 8 pm and 11 pm to ensure the Customer is home to accept the call. However, the Customer's preferences stored in database 118 could indicate that the Customer only wants to be called between 6 pm and 8 pm.

In accordance with one embodiment of the present invention, the Receiver could automatically check both Sender database 117 and Customer database 118 before sending the Request to event queue interface 103 (thereby initiating the call process). If a conflict is detected between databases 117 and 118 (as shown by the above example), the Receiver can determine which database should take priority. In general, for Customer satisfaction, the Receiver would typically ensure that any Customer preference is honored and therefore resolve the conflict by using Customer database 118 instead of Sender database 117. Thus, Senders do not have to set up policies for every scenario. Instead, Senders can advantageously leverage behavior/preference information already gathered in Customer database 118 by the Receiver.

OTHER EMBODIMENTS

In one embodiment, instead of providing the URL to the application including the VoiceXML, the Sender can include the actual program. In this embodiment, an event queue server 104 could recognize this distinction and request that a temporary content database 108 store the program. In this manner, when a telephony server 102 requests the program, the URL (assigned by event queue server 104) is to a content server 107, which in turn accesses the appropriate program in temporary content database 108. This embodiment is particularly fast to deploy and can be employed when a single Request is being sent to many Customers. In accordance with one feature of this embodiment, content database 108 could be scanned to identify and remove "stale" content, i.e. content stored more than a predetermined time period.

Note that the present invention can easily be incorporated into and augment a service already being provided by the Receiver to the Customer. For example, assuming the Receiver provides a voice portal, which allows callers to access information via a telephone, a previously unreachable Customer (because of a service outage, the Customer's cell phone could be out of range, or simply a bad connection) could call the Receiver (for example, using a phone unknown to the Receiver or the Sender) and say "My_Name" and then get status information regarding the Requests previously initiated, but not completed. In one embodiment, this service would include account linking, such that a call to the Receiver would also link the Customer to Sender database 117, thereby accessing the specific Request(s) relevant to the Customer. U.S. patent application Ser. No. 09/694,797, entitled, "Method and Apparatus for Web-to-Phone Account Linking", filed on Oct. 20, 2000, describes this account linking in detail and is incorporated by reference herein. At this point, the Customer could then participate in the interactive telephony session. Note that sending Requests could also be in addition to other types of Sender notification. Thus, the Sender could send an email Request to the Receiver as well as a direct email to the Customer regarding the subject matter of the Request.

In another embodiment of the present invention, a telephony server 102 maintains a log of all current Requests. If telephony server 102 successfully completes an interactive telephony session, i.e the Customer answers the phone and responds to the VoiceXML, then the record of that Request is deleted. When a telephony server 102 starts up, it can check the log for any Requests. If the log is empty, the log was closed properly. Otherwise, for any remaining Requests, telephony server 102 can log the lost Request in accounting database 115.

The above description of various embodiments of the invention has been provided for purposes of illustration. The description is not intended to limit the invention to the precise embodiments discussed. Those skilled in the art will find various modifications, additions, or deletions apparent from the description. For example, although various components are discussed herein, other embodiments of the invention could include combinations of these various components. Thus, the present invention is limited only by the appended claims.

The invention claimed is:

1. A method for providing a telephony session, the method comprising:
   receiving an electronic mail request from a third party using a computer to provide the telephony session;
   determining whether the electronic mail request passes a policy check;
   calling the customer in accordance with the electronic mail request, in response to determining that the electronic mail request passes the policy check;
   accessing a URL providing a VoiceXML application in accordance with the electronic mail request;
   running the VoiceXML application when the customer answers; and
   responding to an interaction with the customer during the telephony session.

2. The method of claim 1, wherein the policy check is set by the third party.

3. The method of claim 1, wherein the policy check is set by the customer.

4. The method of claim 1, wherein the policy check is set by a receiver of the request.

5. A system of providing a telephony session requested by a third party, the system comprising:
   a gateway for receiving an electronic mail request from the third party using a computer to provide the telephony session;
   an event queue server for determining whether the electronic mail request passes a policy check;
   a telephony server for calling the first customer in accordance with the electronic mail request, in response to determining that the electronic mail request passes a policy check; accessing a URL providing a VoiceXML application, running the VoiceXML application when the first customer answers, and responding to an interaction with the first customer during the telephony session, wherein the telephony server configurably receives an incoming call from a second customer.

6. The system of claim 5, further comprising:
   a plurality of telephony servers; and wherein the event queue interface monitors a status of each of the plurality of telephony servers to determine availability for the telephony session.

7. A method of allowing an intermediate party to facilitate an interactive telephony session between a third party and a customer, the method comprising:

receiving an electronic mail request for the interactive telephony session from the third party using a computer;

determining if the electronic request passes a policy check; and initiating the interactive telephony session with the customer if the electronic mail request passes the policy check; accessing a URL providing a VoiceXML application in accordance with the electronic mail request;

running the VoiceXML application when the customer answers;

responding to an interaction with the customer during the interactive telephony session.

8. The method of claim 7, wherein the policy check includes confirming required resources.

9. The method of claim 8, wherein confirming required resources includes determining whether an associated file is attached to the electronic request.

10. The method of claim 8, wherein confirming required resources includes determining whether an associated file is referenced in the electronic request.

11. The method of claim 7, wherein the policy check includes rejecting any request for the session to be placed or not placed during certain hours.

12. The method of claim 7, wherein the policy check includes limiting a number of sessions that a customer receives in a predetermined time period.

13. The method of claim 7, wherein the policy check includes load management.

14. The method of claim 13, wherein load management includes modifying a selection process of a plurality of telephony servers.

15. The method of claim 13, wherein load management includes determining a load-balancing scheme.

16. The method of claim 13, wherein load management includes maximizing a number of simultaneous sessions as a percentage of capacity.

17. The method of claim 7, wherein the policy check includes security maintenance.

* * * * *